(12) United States Patent
Lee (10) Patent No.: US 11,235,797 B2
(45) Date of Patent: Feb. 1, 2022

(54) CHILD TRANSPORTER WITH DUAL CANOPY

(71) Applicant: Curtis Chien Lee, Austin, TX (US)

(72) Inventor: Curtis Chien Lee, Austin, TX (US)

( * ) Notice: Subject to any disclaimer, the term of this patent is extended or adjusted under 35 U.S.C. 154(b) by 0 days.

(21) Appl. No.: 16/838,096

(22) Filed: Apr. 2, 2020

(65) Prior Publication Data

US 2020/0317247 A1  Oct. 8, 2020

Related U.S. Application Data

(60) Provisional application No. 62/830,628, filed on Apr. 8, 2019.

(51) Int. Cl.
*B62B 9/14* (2006.01)
*B62B 7/04* (2006.01)
*B62B 7/00* (2006.01)

(52) U.S. Cl.
CPC .............. *B62B 9/142* (2013.01); *B62B 7/006* (2013.01); *B62B 7/04* (2013.01)

(58) Field of Classification Search
CPC .. B62B 7/006; B62B 7/04; B62B 9/14; B62B 9/142

USPC ....................................................... 280/47.38
See application file for complete search history.

(56) References Cited

U.S. PATENT DOCUMENTS

| 6,139,046 A * | 10/2000 | Aalund ..................... B62B 7/08 |
| | | 280/47.38 |
| 6,409,206 B1 * | 6/2002 | Willrich .................... B62B 9/00 |
| | | 261/DIG. 3 |
| 7,150,162 B1 | 12/2006 | Brunner |
| 10,384,706 B1 * | 8/2019 | Vazquez ................. E04H 15/02 |

FOREIGN PATENT DOCUMENTS

| CN | 204555098 U | 8/2015 |
| CN | 205924745 U | 2/2017 |
| WO | 2017058507 A3 | 4/2017 |

OTHER PUBLICATIONS

International Search Report dated Jun. 26, 2020 in counterpart PCT Application PCT/US2020/026677.

* cited by examiner

*Primary Examiner* — John D Walters
(74) *Attorney, Agent, or Firm* — Blank Rome LLP (57) ABSTRACT

A child transporter includes a seat and a canopy. The canopy is disposed above the seat, and includes an air channel configured to direct a wind curtain about the seat.

20 Claims, 12 Drawing Sheets

CHILD TRANSPORTER WITH DUAL CANOPY

CROSS-REFERENCE TO RELATED APPLICATIONS

The present application claims priority to U.S. Provisional Patent Application No. 62/830,628, filed Apr. 8, 2019, entitled "Child Transporter with Dual Canopy," which is hereby incorporated herein by reference in its entirety.

BACKGROUND

Transporters for conveying infants or toddlers, also referred to as strollers, prams, pushchairs, baby buggies, baby carriages, etc. are sized to easily accommodate a small child or infant, and are used to transport the child conveniently from place to place. A stroller generally includes front and rear wheels connected by a frame to handles. The frame supports a seat for holding a child. The front and rear wheels define a wheel base for the stroller, rest on the ground while the stroller is in use, and are used to move the stroller.

SUMMARY

A child transporter with a dual canopy that directs a wind curtain about the stroller is disclosed herein. In one example, a child transporter includes a frame, a seat, a canopy, and an air generator. The seat is supported by the frame. The canopy is disposed above the seat, and includes a first layer and a second layer. The second layer is separated from the first layer to form an air channel. The air generator is coupled to the canopy and configured to induce flow of air in the air channel.

In another example, a child transporter includes a seat and a canopy. The canopy is disposed above the seat, and includes an air channel configured to direct a wind curtain about the seat.

In a further example, a child transporter includes a frame, a plurality of wheels, a container, a canopy, and an air generator. The plurality of wheels is coupled to the frame. The container is for holding an occupant and is supported by the frame. The canopy is disposed above the seat, and includes an air inlet, an air channel, and an air outlet. The air channel includes a first end coupled to the air inlet. The air outlet is formed at a second end of the air channel, and is configured to form a wind curtain about the container. The air generator is coupled to the air inlet and configured to induce flow of air in the air channel.

BRIEF DESCRIPTION OF THE DRAWINGS

For a detailed description of various examples, reference will now be made to the accompanying drawings in which.

DETAILED DESCRIPTION

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

A wide variety of child transport systems have been devised, and are available with features that enhance and simplify transportation of a child. For example, various child transportation systems include features intended to protect a child from environmental hazards, such as pollutants and insects. The child transporter disclosed herein includes a dual layer canopy. The two layers of the canopy form an air channel that conducts air from an air generator to an outlet. The air passes out of the channel to provide a wind or air curtain about a seat of the child transporter. The wind curtain protects a child placed in the seat from environmental hazards.

Figure 1:
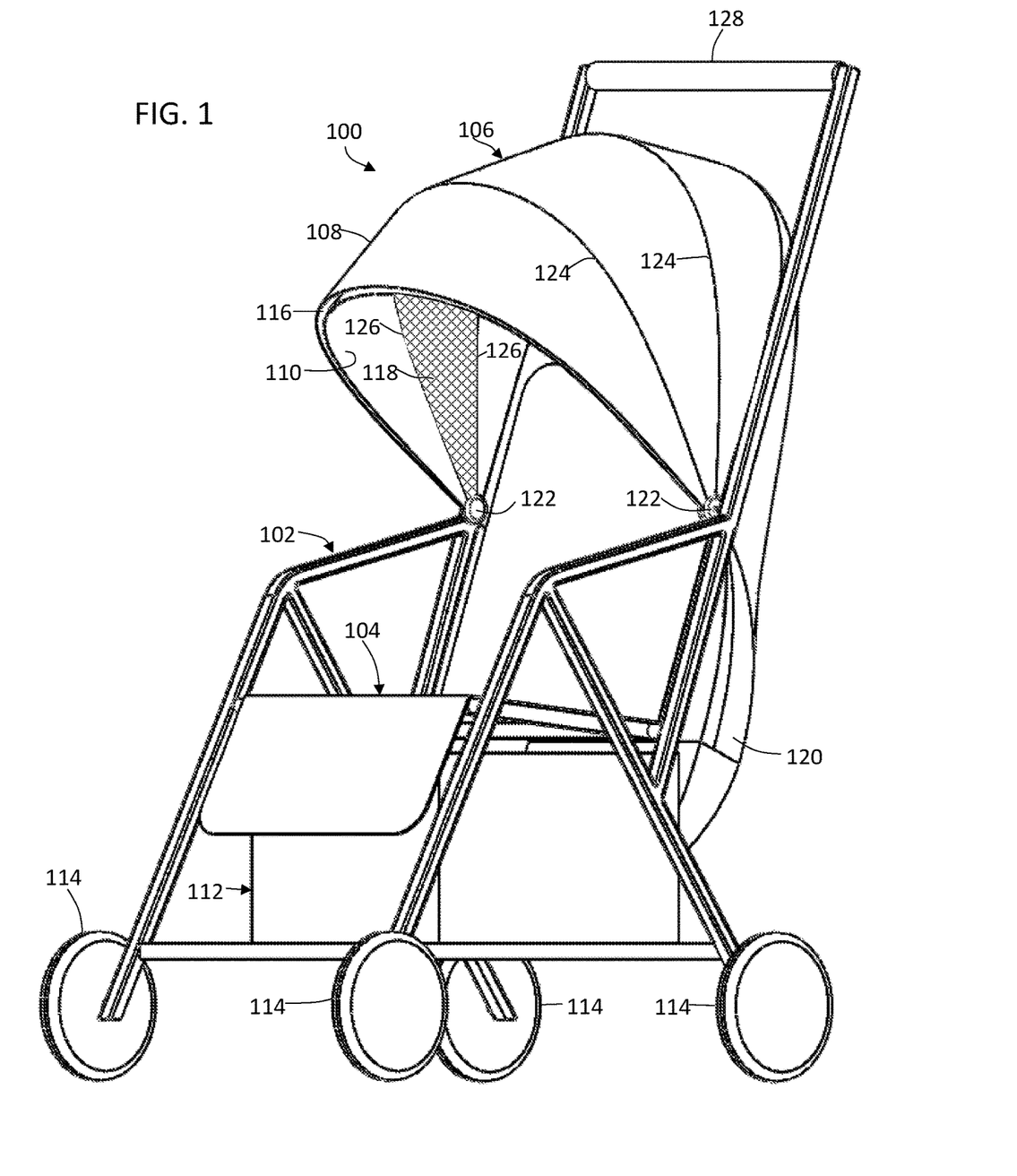
FIG. 1 shows a first embodiment of a child transporter that provides a wind curtain about the seat in accordance with the present disclosure.

FIG. 1 shows a first embodiment of a child transporter 100 that provides a wind curtain about the seat in accordance with the present disclosure. The child transporter 100 includes a frame 102, a seat 104, a dual-layer canopy 106, and an air generator 112. The seat 104 includes a bottom and a back arranged to hold a child or other suitably sized occupant. The seat 104 is an example of a container for holding an occupant, such as a child, to be transported in the child transporter 100. The seat 104 is supported by the frame 102. Wheels 114 are attached to the frame 102 to enable the child transporter 100 to roll across a surface. A handle 128 is also attached to, or formed as part of, the frame 102 to facilitate locomotion of the child transporter 100.

The dual-layer canopy 106, the air generator 112, and the air duct 120 are also coupled to the frame 102. The dual-layer canopy 106 includes an outer layer 108 and an inner layer 110. The outer layer 108 is separated from (spaced apart from) the inner layer 110 to form an air channel between the outer layer 108 and the inner layer 110. In some implementations of the dual-layer canopy 106, an air permeable material, such as a three-dimensional mesh or porous foam is disposed between the outer layer 108 and the inner layer 110 to provide structure to the dual-layer canopy 106 while allowing air to pass through the air channel. Air travels through the air channel and exits the dual-layer canopy 106 at an outlet 116. The outlet 116 is disposed at an end of the dual-layer canopy 106 in some embodiments of the child transporter 100, and at other locations in some embodiments of the child transporter 100. The air exiting the outlet 116 forms the wind curtain about the seat 104 that protects the child placed in the seat 104. That is, the high velocity air (2-10 m/s wind speeds) curtain creates a barrier that separates the space external to the child transporter 100 from space between the dual-layer canopy 106 and the seat 104. In addition, the output is directed away from the child transporter 100 so that air is not blown onto a child in the seat 104 and to counteract wind that is blown into the stroller when it is stationary or in transport.

The outlet 116 may extend across the entire front section of the dual-layer canopy 106 with the airflow and velocity thereof being adjusted based upon the space between the upper layer 108 and the lower layer 110 and the output of the air generator 112. Selective areas can also be blocked to prevent airflow from being emitted at certain sections of the outlet 116. Nozzles, vents, and/or inserts may be provided at the outlet 116 to further adjust the airflow or change the direction of the airflow, and to counteract differing external wind speeds. Additionally, the spacing between the upper layer 108 and the lower layer 110 may be unequal to provide different flow rates or speeds at different locations of the dual-layer canopy 106.

The outer layer 108 is supported by and coupled to the frame 102 by supports 124, and the inner layer 110 is supported by and coupled to the frame 102 by supports 126. Ends of the supports 124 and the supports 126 are coupled to hinges 122 to allow the dual-layer canopy 106 to collapse or extend. The outer layer 108 and the inner layer 110 may be formed of air impermeable, or generally air impermeable, materials, such as plastic or fabric such as ripstop nylon or polyester. The inner layer 110 may also include a panel 118 formed of a second material, such as a mesh, perforated material, woven cotton or rayon, that is more permeable to air than the material forming the outer layer 108. The panel 118 provides an outlet for air flow toward the seat 104. The output of air from the panel 108 can be adjusted by a number of different parameters such as; adjusting the output of the air generator 112, the outlet size and gap between the layers 108 and 110, the degree of air permeability between the materials of the inner layer 110, the placement of the materials on the inner layer 110, and the size/surface area of the materials used on the inner layer 110. These parameters can affect the air velocity of the output which can impact the comfort of a child in the seat 104. In some embodiments, the inner air output is proximate to the face of the child with a low air velocity (0-1.5 m/s wind speeds) and sufficient surface area of panel(s) 118 to provide sufficient air to the child. The inner air output additionally creates a high-pressure zone which helps prevent external air from entering the space.

The air generator 112 includes a housing that is supported by a base section of the frame 102. The air generator 112 is coupled to the dual-layer canopy 106 by the air duct 120. In some implementations of the child transporter 100, the air generator 112 may be selectively disconnected from the air duct 120. The air generator 112 includes a fan, a blower, or other device that produces an air current. The air generator 112 is powered by a battery or solar cell disposed within the housing of the air generator 112, or connected to the air generator 112 via one or more conductors. The air generator 112 may be controlled by circuitry and a user control panel. The air current generated by the air generator 112 flows through the air duct 120 to the dual-layer canopy 106, and through the dual-layer canopy 106 to form the wind curtain. In some embodiments of the 100, the air generator 112 is coupled to the dual-layer canopy 106 without the intervening air duct 120.

Figure 2:
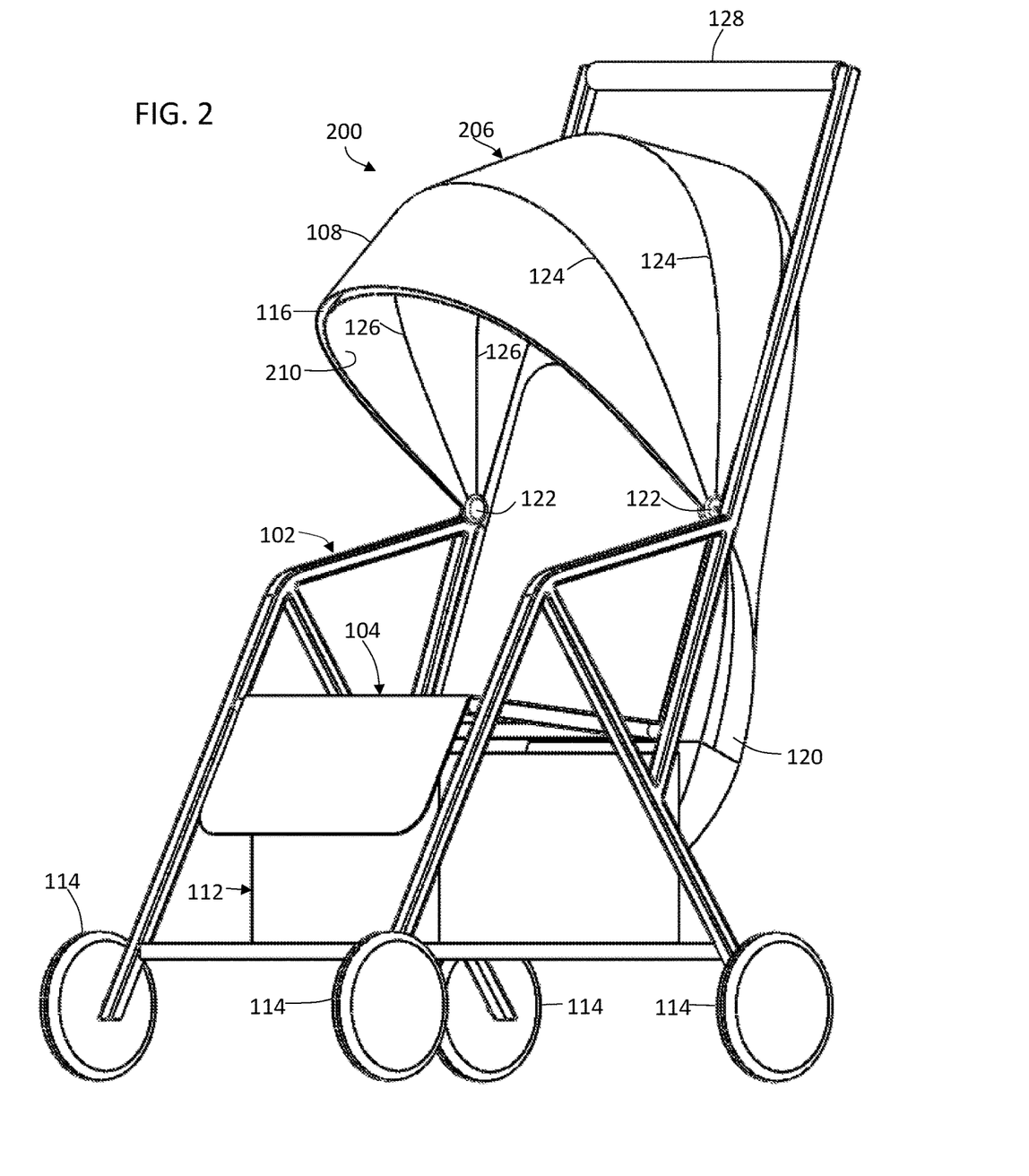
FIG. 2 shows a second embodiment of a child transporter that provides a wind curtain about the seat in accordance with the present disclosure.

FIG. 2 shows a second embodiment of a child transporter 200 that provides a wind curtain about the seat in accordance with the present disclosure. The child transporter 200 is similar to the child transporter 100. The child transporter 200 includes a dual-layer canopy 206. The dual-layer canopy 206 is similar to the dual-layer canopy 106, but lacks the panel 118. The dual-layer canopy 206 includes an outer layer outer layer 108 and an inner layer 210. The outer layer 108 is separated from the inner layer 210 to form an air channel between the outer layer 108 and the inner layer 210. In some implementations of the dual-layer canopy 206, an air permeable material, such as a mesh or foam is disposed between the outer layer 108 and the inner layer 210 to provide structure to the dual-layer canopy 206 while allowing air to pass through the air channel. Air travels through the air channel and exits the dual-layer canopy 206 at the outlet 116. The air exiting the outlet 116 forms the wind curtain about the seat 104. The wind curtain protects the child placed in the seat 104. The outer layer 108 is supported by and coupled to the frame 102 by the supports 124, and the inner layer 210 is supported by and coupled to the frame 102 by the supports 126. Ends of the supports 124 and the supports 126 are coupled to hinges 122 to allow the dual-layer canopy 206 to collapse or extend. The outer layer 108 and the inner layer 210 may be formed of air impermeable, or generally air impermeable, materials, such as plastic or fabric.

Figure 3:
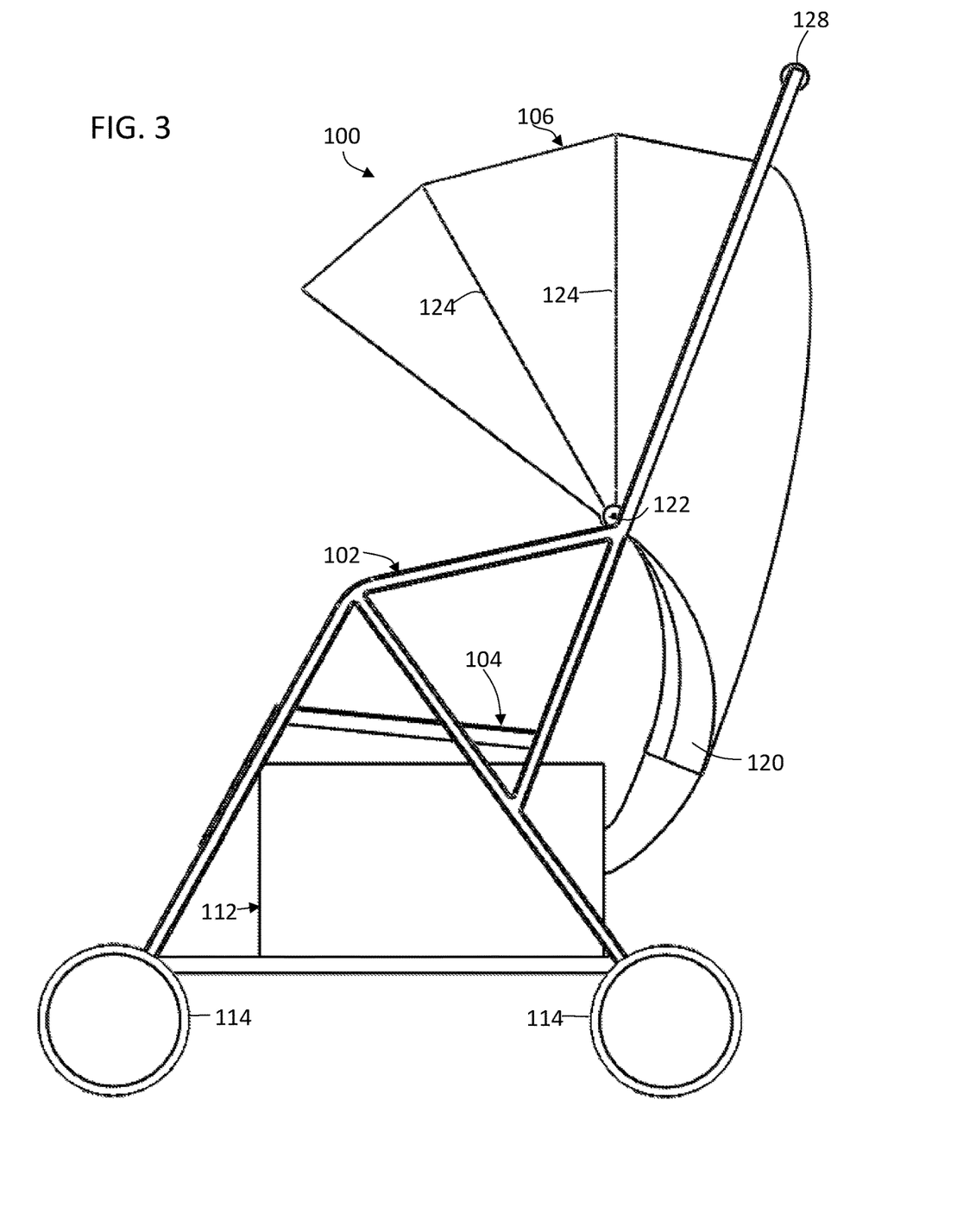
FIG. 3 shows a side view of a child transporter that provides a wind curtain about the seat in accordance with the present disclosure.

FIG. 3 shows a side view of the child transporter 100 or the child transporter 200.

Figure 4:
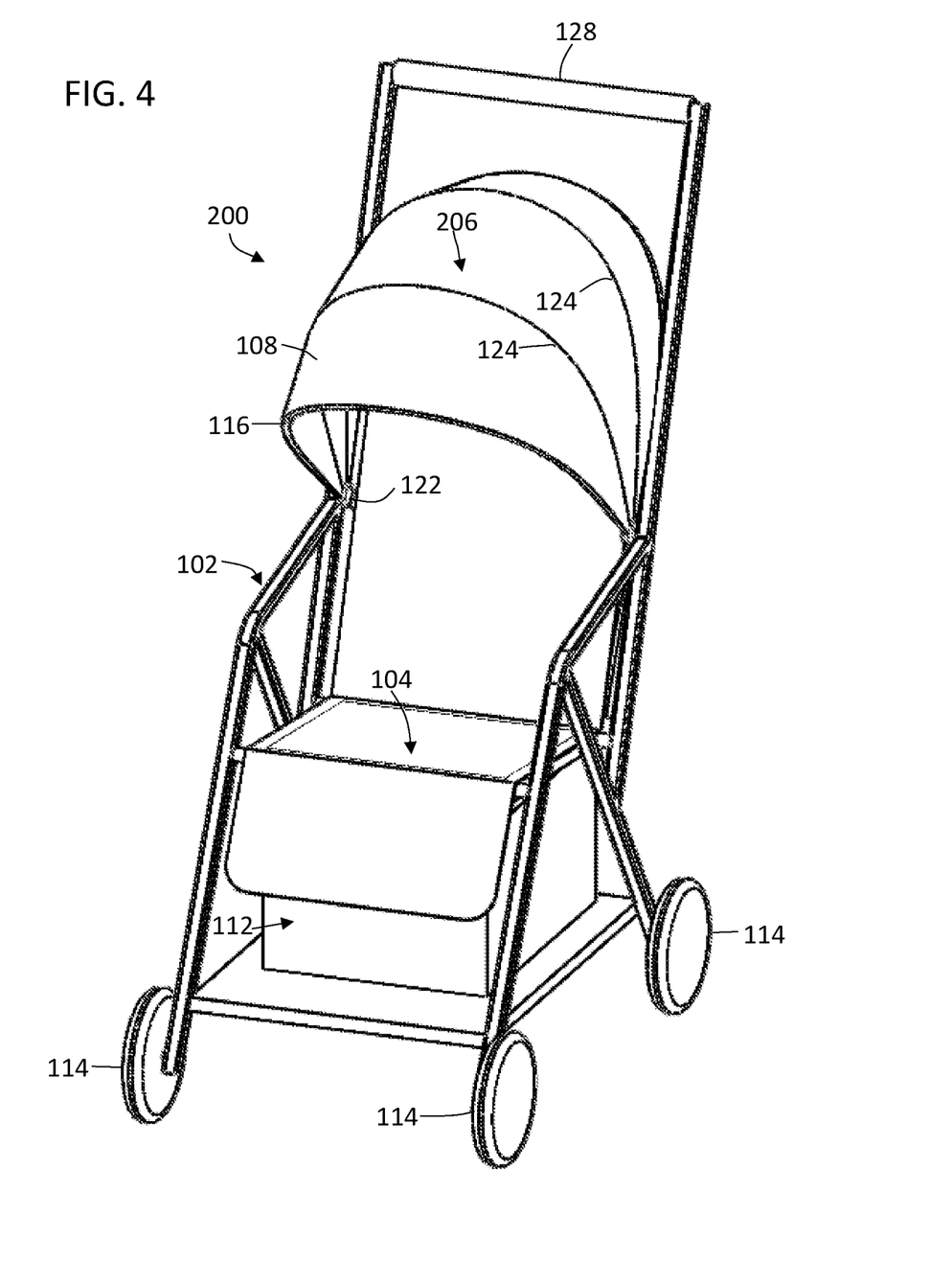
FIG. 4 shows another view of a child transporter that provides a wind curtain about the seat in accordance with the present disclosure.

FIG. 4 shows another view of the child transporter 200 or the child transporter 100.

Figure 5:
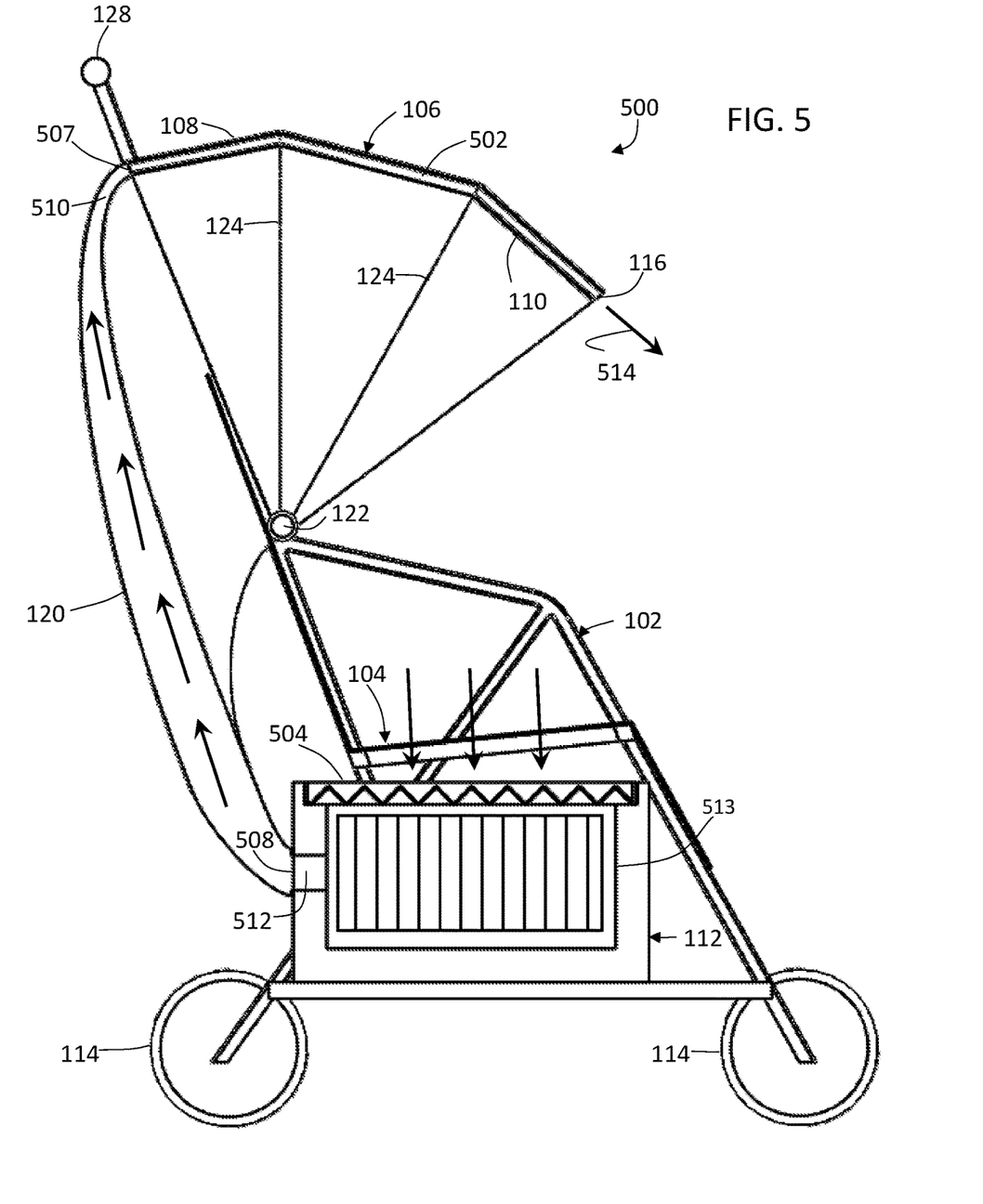
FIG. 5 shows a cross-sectional view of an embodiment of a child transporter that provides a wind curtain about the seat in accordance with the present disclosure.

FIG. 5 shows a cross-sectional view of a child transporter 500 that provides a wind curtain about the seat in accordance with the present disclosure. The child transporter 500 is an implementation of the child transporter 200. The dual-layer canopy 106 includes an inlet 507. The inlet 507 is coupled to the outlet 116 via the air channel 502 formed between the outer layer 108 and the inner layer 110.

The air generator 112 includes an air filter 504 through which air enters the air generator 112. The air filter 504 may include electrostatic, ionic, ozone, negative ion or other air filtration technology. The air generator 112 may also include heating, cooling, and/or humidity control elements to adjust the temperature and/or humidity of the air output from the air generator 112. The air generator 112 includes an outlet 512 that is coupled to the air duct 120. The air duct 120 includes an inlet 508 and an outlet 510. The outlet 512 of the air generator 112 is coupled to an inlet 508 of the air duct 120, and the outlet 510 of the air duct 120 is coupled to the inlet 507 of the dual-layer canopy 106. The air generator 112 includes a blower 513 that forces air through the air duct 120 and the dual-layer canopy 106 to produce the wind curtain 514. The air duct 120 may be selectively detached from and attached to the dual-layer canopy 106 and the air generator 112 in some implementations of the child transporter 500.

Figure 6:
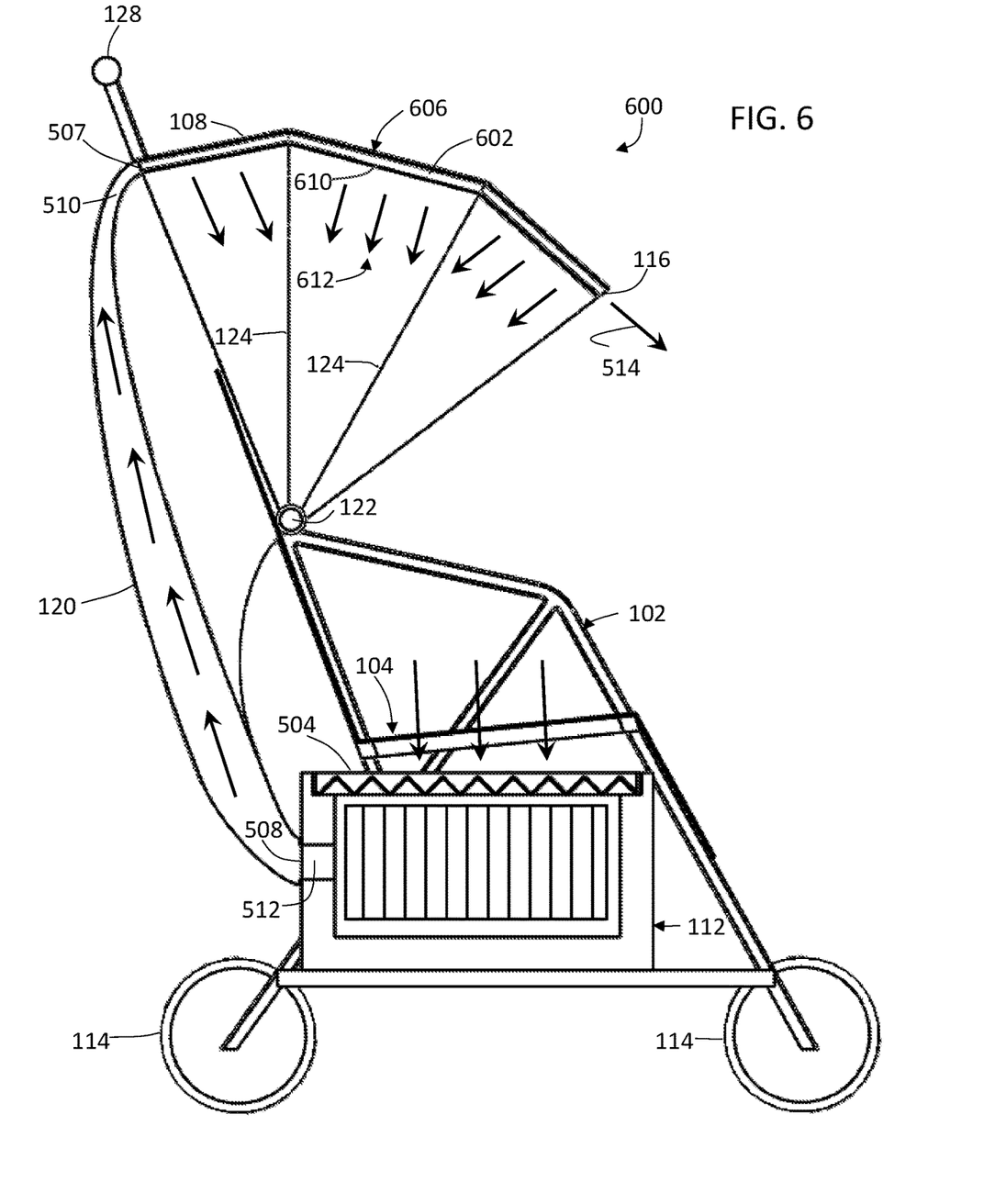
FIG. 6 shows a cross-sectional view of an embodiment of a child transporter that provides a wind curtain and air flow through an inner layer of a canopy in accordance with the present disclosure.

FIG. 6 shows a cross-sectional view of a child transporter 600 that provides a wind curtain and air flow through an inner layer of a canopy in accordance with the present disclosure. The child transporter 600 is similar to the child transporter 100. The child transporter 600 includes a dual-layer canopy 606 that is similar to the dual-layer canopy 106. The dual-layer canopy 606 includes the outer layer 108 and an inner layer 610. The outer layer 108 is separated from the inner layer 610 to form an air channel 602 between the outer layer 108 and the inner layer 610. In some implementations of the dual-layer canopy 606, an air permeable material, such as a mesh or foam is disposed between the outer layer 108 and the inner layer 610 to provide structure to the dual-layer canopy 606 while allowing air to pass through the air channel 602. Air travels through the air channel 602 and exits the dual-layer canopy 606 at the outlet 116. The air exiting the outlet 116 forms the wind curtain 514 about the seat 104 that protects the child placed in the seat 104. While, the outer layer 108 is formed of air impermeable, or generally air impermeable, materials, such as plastic or fabric, the inner layer 610 is formed of a material, such as a mesh, that is more permeable to air than the material forming the outer layer 108. For example, the inner layer 610 may be formed of a material that is similar to that of the panel 118. Air 612 flows through the inner layer 610 towards the seat 104. In some implementations of the child transporter 600, the inner layer 610 is formed of the same air impermeable material as the outer layer 108, or a similar material, but includes multiple ports or perforations through which the air 612 flows through the inner layer 610 towards the seat 104.

Figure 7:
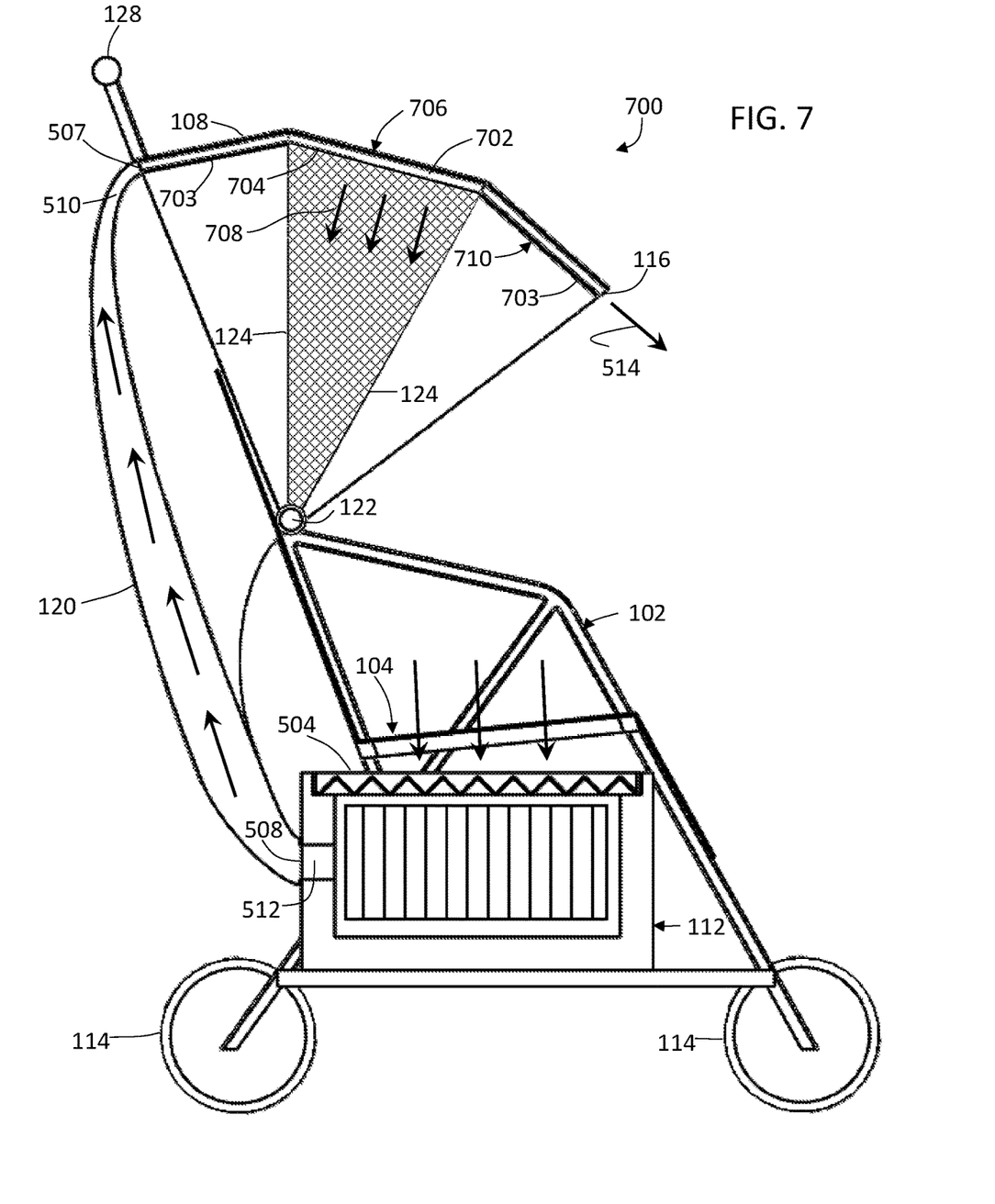
FIG. 7 shows a cross-sectional view of an embodiment of a child transporter that provides a wind curtain and air flow through a portion of an inner layer of a canopy in accordance with the present disclosure.

FIG. 7 shows a cross-sectional view of a child transporter 700 that provides a wind curtain about the seat 104 in accordance with the present disclosure. The child transporter 700 is an implementation of the child transporter 100. The child transporter 700 includes a dual-layer canopy 706 that is similar to the dual-layer canopy 106. The dual-layer canopy 706 includes the outer layer 108 and an inner layer 710. The outer layer 108 is separated from the inner layer 710 to form an air channel 702 between the outer layer 108 and the inner layer 710. The inner layer 710 includes one or more panels 703 and one or more panels 704. The panels 703 are formed of material that is relatively impermeable to air, such as the material of which the outer layer 108 is formed. The panels 704 are formed of a material, such as a mesh, that is more permeable to air than the panels 703. Air travels through the air channel 702 and exits the dual-layer canopy 706 at the outlet 116. The air exiting the outlet 116 forms the wind curtain 514 about the seat 104 that protects the child placed in the seat 104. Air 708 flows through the panels 704 towards the seat 104. In some implementations of the dual-layer canopy 706, an air permeable material, such as a mesh or foam is disposed between the outer layer 108 and the inner layer 710 to provide structure to the dual-layer canopy 706 while allowing air to pass through the air channel.

Figure 8:
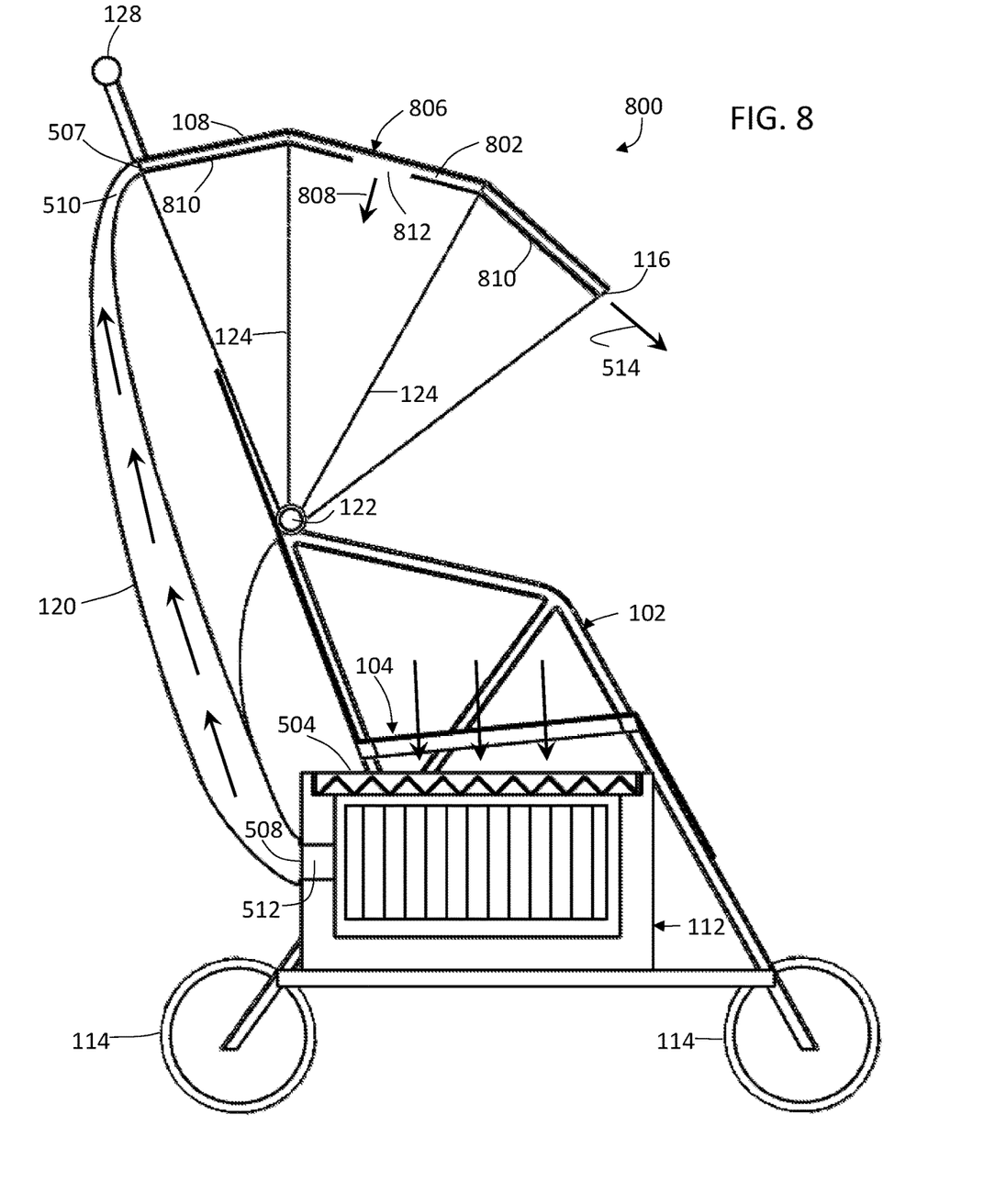
FIG. 8 shows a cross-sectional view of an embodiment of a child transporter that provides a wind curtain and includes a vent in an inner layer of a canopy in accordance with the present disclosure.

FIG. 8 shows a cross-sectional view a child transporter 800 that provides a wind curtain and includes a vent in an inner layer of a canopy in accordance with the present disclosure. The child transporter 800 is similar to the child transporter 200. The child transporter 800 includes a dual-layer canopy 806 that is similar to the dual-layer canopy 206. The dual-layer canopy 806 includes the outer layer 108 and an inner layer 810. The outer layer 108 is separated from the inner layer 810 to form an air channel 802 between the outer layer 108 and the inner layer 810. The inner layer 810 includes a vent 812. The inner layer 810 is formed of material that is relatively impermeable to air, such as the material of which the outer layer 108 is formed. Air travels through the air channel 802 and exits the dual-layer canopy 806 at the outlet 116. The air exiting the outlet 116 forms the wind curtain 514 about the seat 104 that protects the child placed in the seat 104. The inner layer 810 includes a vent 812, e.g., an opening in the inner layer 810, through which air 808 flows through the vent 812 towards the seat 104.

Figure 9:
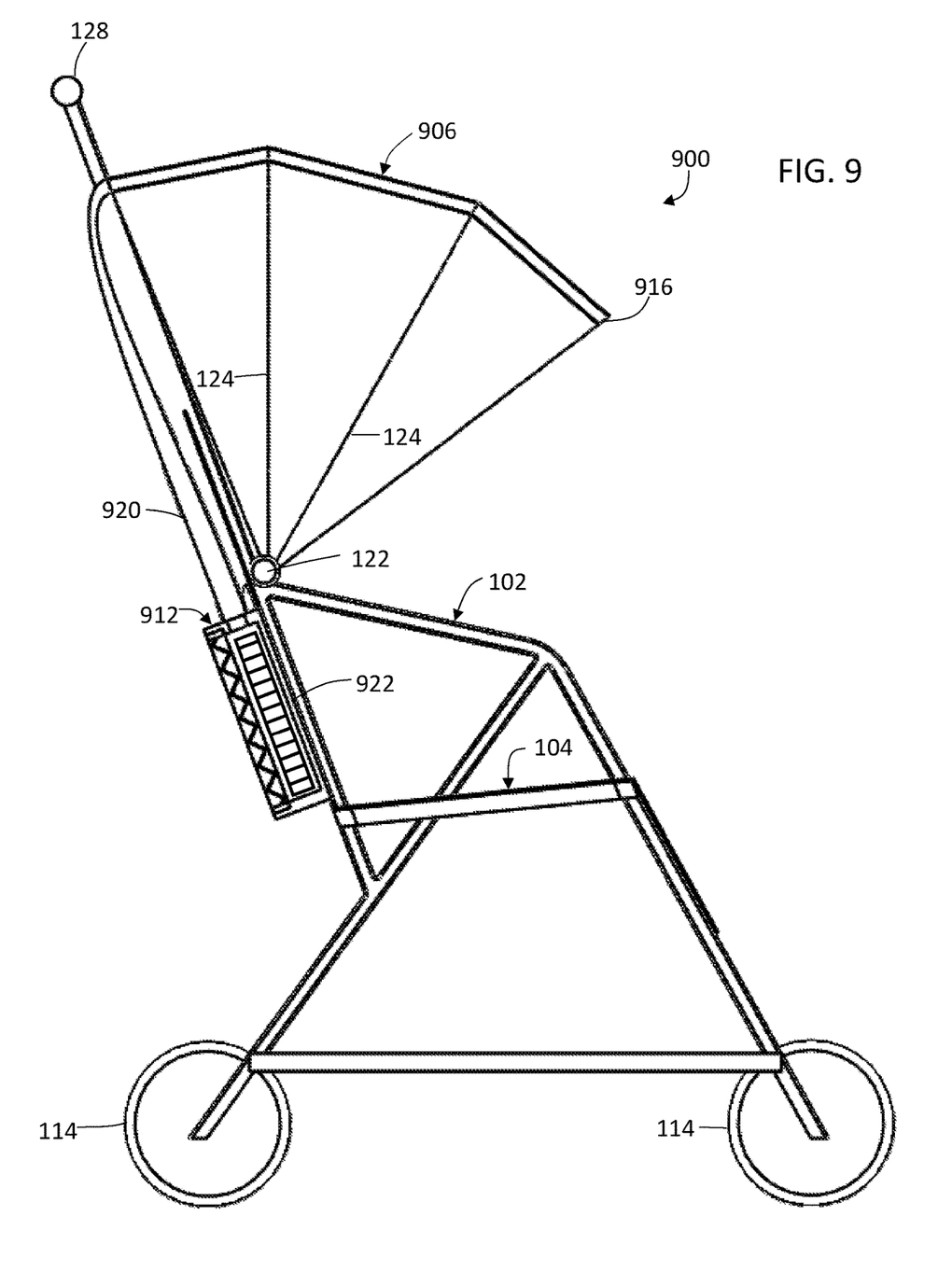
FIG. 9 shows a side view of an example child transporter that includes a back mounted air generator for providing a wind curtain about the seat in accordance with the present disclosure.

FIG. 9 shows a side view of an example child transporter 900 that includes a back mounted air generator for providing a wind curtain about the seat in accordance with the present disclosure. The child transporter 900 is similar to the child transporter 100, the child transporter 200, the child transporter 500, the child transporter 600, the child transporter 700, or the child transporter 800. The child transporter 900 includes a frame 102, a seat 104, a dual-layer canopy 906, and an air generator 912. The dual-layer canopy 906 is an implementation of the dual-layer canopy 106, the dual-layer canopy 206, the dual-layer canopy 606, the dual-layer canopy 706, or the dual-layer canopy 806, and may include any features thereof. The dual-layer canopy 906 includes an outlet 916. Air exiting the outlet 916 forms a wind curtain about the seat 904.

The air generator 912 is similar to and may include the features of the air generator 112. In the child transporter 900, the air generator 912 is coupled to a back portion 922 of the frame 102 or a back of the seat 102, rather than to a base portion of the frame 102 as in the child transporter 100. The air generator 912 is coupled to the dual-layer canopy 906 via an air duct 920. The air duct 902 is an implementation of the air duct 120. In various examples of child transporters implemented in accordance with this disclosure, the air generator may be mounted at any location of the frame 102 or any location of the child transporter.

Figure 10:
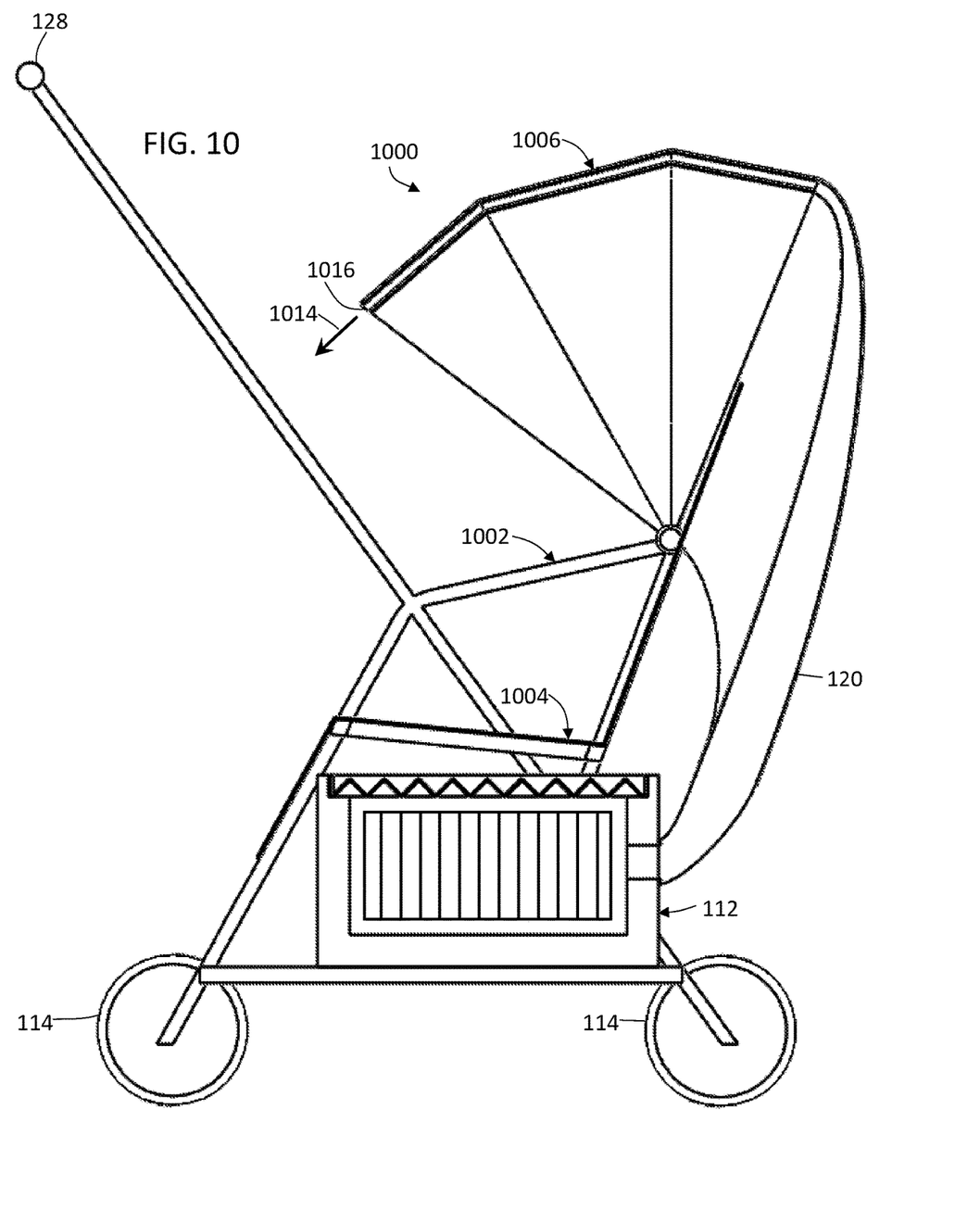
FIG. 10 shows a side view of an example rear-facing child transporter that that provides a wind curtain about the seat in accordance with the present disclosure.

FIG. 10 shows a side view of an example rear-facing child transporter 1000 that provides a wind curtain about the seat in accordance with the present disclosure. The child transporter 1000 is similar to the child transporter 100, the child transporter 200, the child transporter 500, the child transporter 600, the child transporter 700, the child transporter 800, or the child transporter 900. The child transporter 1000 includes a frame 1002, a seat 1004, a dual-layer canopy 1006, and an air generator 112. The dual-layer canopy 1006 is an implementation of the dual-layer canopy 106, the dual-layer canopy 206, the dual-layer canopy 606, the dual-layer canopy 706, the dual-layer canopy 806, or the dual-layer canopy 906, and may include any features thereof. In the child transporter 1000, the seat 1004 faces the rear of the child transporter 1000. That is, the seat 1004 faces towards the handle 128 rather than way from the handle 128. The outlet 1016 of the dual-layer canopy 1006 also faces the rear of the child transporter 1000, and the wind curtain 1014 flows from the outlet 1016 about the seat 1004.

Figure 11:
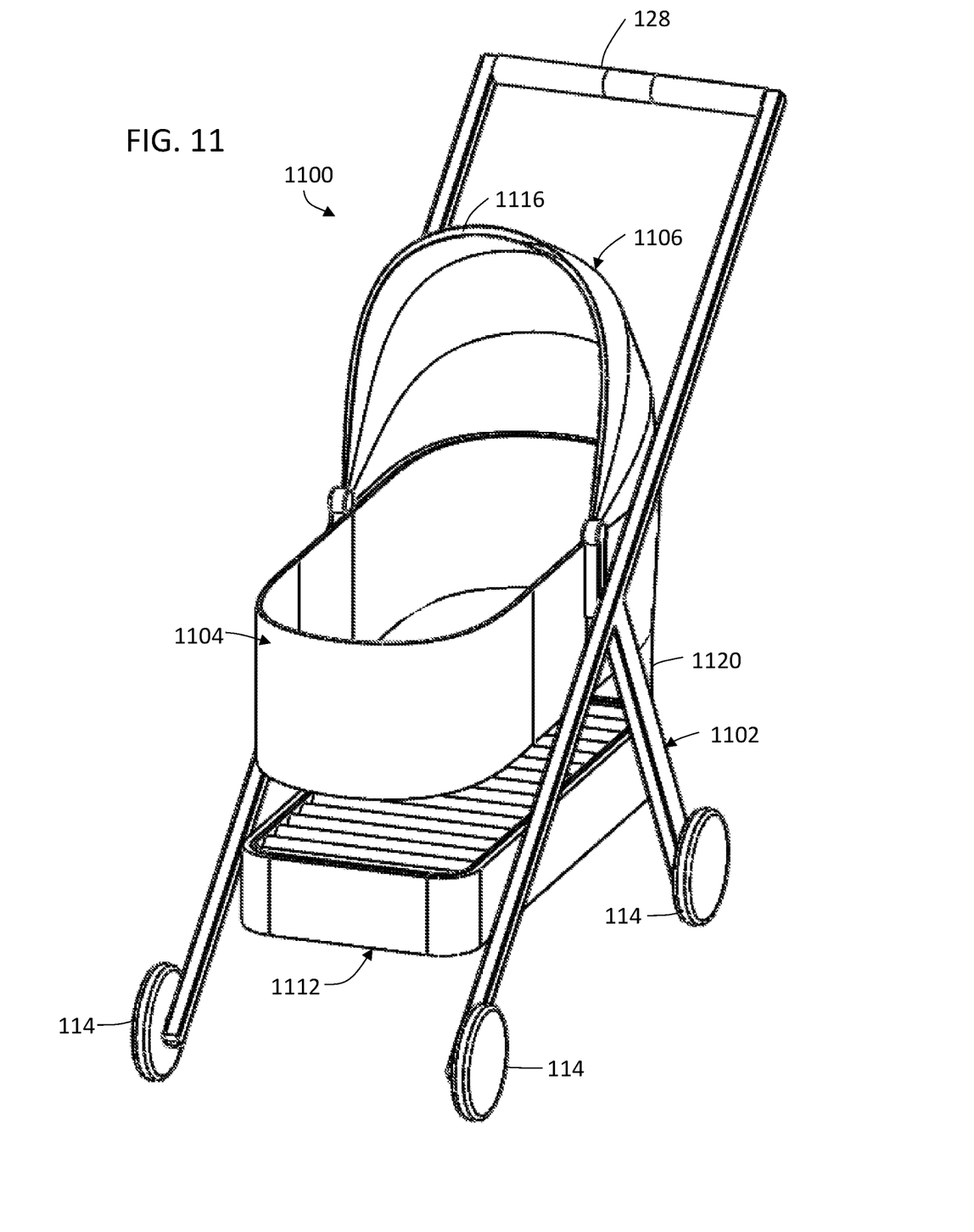
FIG. 11 shows a perspective view of a baby carriage that provides a wind curtain about the bed in accordance with the present disclosure.

FIG. 11 shows a perspective view of a baby carriage 1100 that provides a wind curtain about a basket in accordance with the present disclosure. The baby carriage 1100 is similar to the child transporter 100, the child transporter 200, the child transporter 500, the child transporter 600, the child transporter 700, the child transporter 800, or the child transporter 900. The baby carriage 1100 includes a frame 1102, a basket 1104, a dual-layer canopy 1106, and an air generator 1112. The basket 1104 is sized to hold an infant or child. The basket 1104 is an example of a container for holding an occupant, such as a baby, to be transported in the baby carriage 1100. The dual-layer canopy 1106 is an implementation of the dual-layer canopy 106, the dual-layer canopy 206, the dual-layer canopy 606, the dual-layer canopy 706, the dual-layer canopy 806, or the dual-layer canopy 906, and may include any features thereof. The dual-layer canopy 1106 includes an outlet 1116. Air exiting the outlet 1116 forms a wind curtain about the basket 1104.

The air generator 1112 is coupled to the dual-layer canopy 1106 via an air duct 1120. The air generator 1112 is an implementation of the air generator 112. The air duct 1102 is an implementation of the air duct 120. In various examples of baby carriages implemented in accordance with this disclosure, the air generator 1112 may be mounted at any location of frame 1102 or any location of the baby carriage, and the air duct 1102 may be located at either end of the basket 1104.

Figure 12:
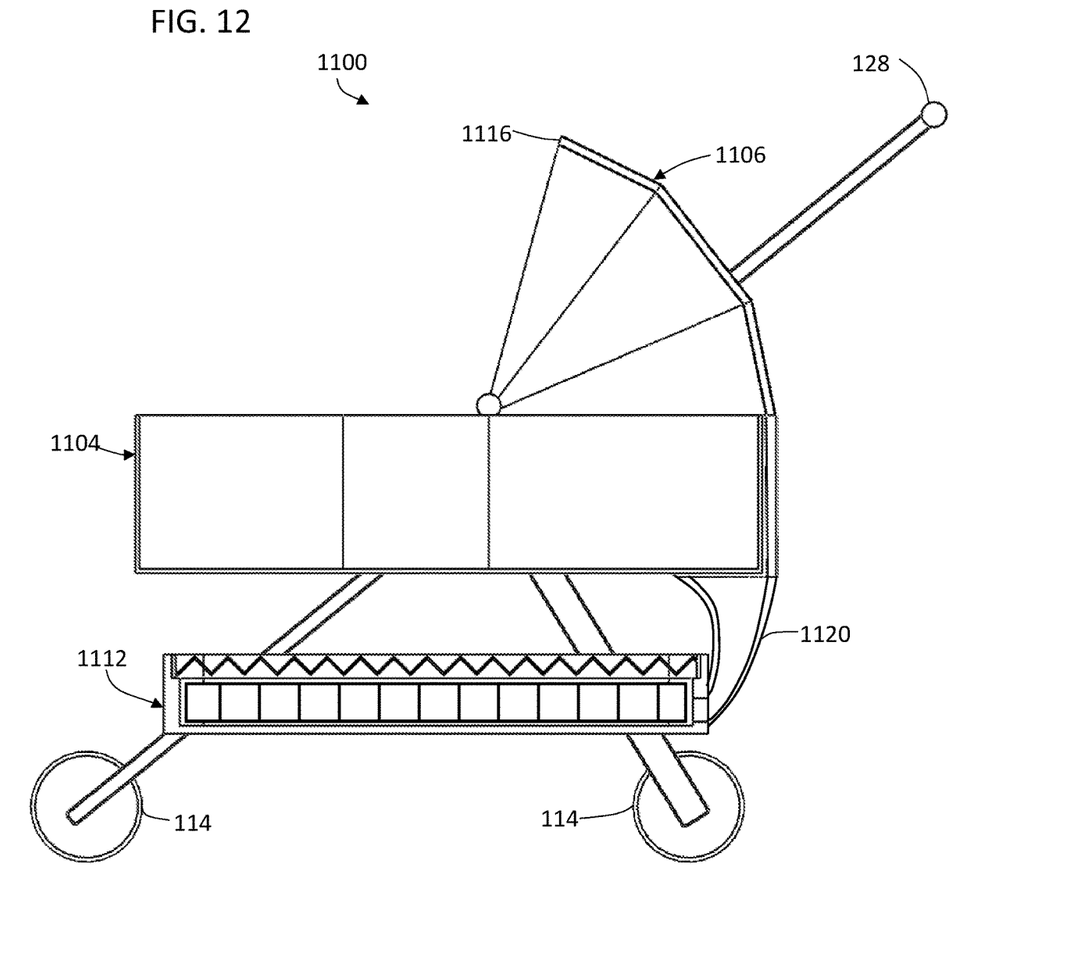
FIG. 12 shows a side cross-sectional view of the child transporter of FIG. 11.

FIG. 12 shows a side cross-sectional view of the child transporter 1100.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A child transporter, comprising:
   a frame;
   a seat supported by the frame;
   a collapsible canopy disposed above the seat, and comprising:
      a first layer; and
      a second layer separated from the first layer to form a collapsible air channel between the first layer and the second layer;
   a hinge coupled to the frame;
   a first support coupled to the hinge and the first layer;
   a second support coupled to the hinge and the second layer; and
   an air generator coupled to the canopy and configured to induce flow of air in the air channel.

2. The child transporter of claim 1, wherein the first layer and the second layer are formed of pliable plastic or fabric to enable the canopy to extend and collapse.

3. The child transporter of claim 1, wherein the canopy comprises:
   an air inlet coupled to the air generator; and
   a circular air outlet configured to direct a circular wind curtain between an interior and an exterior of the child transporter.

4. The child transporter of claim 3, wherein:
   the air inlet is disposed at a first end of the canopy;
   the air outlet is disposed at a second end of the canopy; and
   the second end is opposite the first end.

5. The child transporter of claim 3, wherein:
   the air outlet is a first air outlet; and
   the canopy comprises a second air outlet disposed between the air inlet and the first air outlet, and configured to direct air toward the seat;
   wherein the wind curtain has a higher velocity than air output from the second air outlet.

6. The child transporter of claim 3, further comprising a duct comprising:
   a first end coupled to the air generator; and
   a second end coupled to the air inlet.

7. The child transporter of claim 1, wherein the second layer comprises a mesh panel configured to direct air toward the seat.

8. A child transporter, comprising:
   a seat; and
   a collapsible canopy disposed above the seat, and comprising:
      a first layer; and
      a second layer separated from the first layer to form a collapsible air channel between the first layer and the second layer;
   the air channel configured to direct a circular wind curtain about the seat.

9. The child transporter of claim 8, wherein the second layer comprises a mesh panel configured to direct air toward the seat.

10. The child transporter of claim 9, wherein the canopy comprises an air permeable material disposed between the first layer and the second layer.

11. The child transporter of claim 8, comprising an air generator coupled to the canopy and configured to induce flow of air in the air channel.

12. The child transporter of claim 11, wherein the canopy comprises:
   an air inlet coupled to the air generator; and
   an air outlet configured to direct the wind curtain between an interior and an exterior of the child transporter.

13. The child transporter of claim 12, wherein:
   the air inlet is disposed at a first end of the canopy;
   the air outlet is disposed at a second end of the canopy; and
   the second end is opposite the first end.

14. The child transporter of claim 12, wherein:
   the air outlet is a first air outlet; and
   the canopy comprises a second air outlet disposed between the air inlet and the first air outlet, and configured to direct air toward the seat.

15. The child transporter of claim 12, further comprising:
   a duct comprising:
      an inlet coupled to the air generator; and
      an outlet coupled to the air inlet of the canopy.

16. A child transporter, comprising:
   a frame;
   a plurality of wheels coupled to the frame;
   a container, for holding an occupant, supported by the frame;
   a collapsible canopy disposed above the container, and comprising:
      an air inlet;
      a first layer of fabric;
      a second layer of fabric separated from the first layer of fabric to form a collapsible air channel, the collapsible air channel comprising a first end coupled to the air inlet; and
      an air outlet is formed at a second end of the air channel; and
   an air generator coupled to the air inlet and configured to induce flow of air in the air channel.

17. The child transporter of claim 16, comprising:
   a first support coupled to the first layer;
   a second support coupled to the second layer.

18. The child transporter of claim 16, wherein:
   the air outlet is a first air outlet; and the canopy comprises a second air outlet disposed between the air inlet and the first air outlet, and configured to direct air toward the container.

19. The child transporter of claim 16, further comprising a duct comprising:
   a first end coupled to the air generator; and
   a second end coupled to the air inlet.

20. The child transporter of claim 16, wherein the second layer comprises a mesh panel configured to direct air toward the seat.

* * * * *